United States Patent
Deolalikar et al.

(10) Patent No.: US 8,209,263 B2
(45) Date of Patent: Jun. 26, 2012

(54) SHIPMENT AUTHENTICATION AND TRACKING

(75) Inventors: Vinay Deolalikar, Mountain View, CA (US); Salil Pradhan, San Jose, CA (US); Geoff Lyon, Menlo Park, CA (US); Lester Ortiz, Camuy, PR (US); Alipio Caban, Arecibo, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2307 days.

(21) Appl. No.: 11/112,583

(22) Filed: Apr. 22, 2005

(65) Prior Publication Data

US 2006/0242086 A1    Oct. 26, 2006

(51) Int. Cl.
*G06Q 20/00* (2012.01)
(52) U.S. Cl. .................. 705/67; 726/1; 726/2
(58) Field of Classification Search ........... None
See application file for complete search history.

(56) References Cited

U.S. PATENT DOCUMENTS

| | | | | |
|---|---|---|---|---|
| 6,055,518 | A * | 4/2000 | Franklin et al. | 705/37 |
| 7,182,257 | B2 * | 2/2007 | Ogihara et al. | 235/385 |
| 7,380,723 | B1 * | 6/2008 | Oget | 235/462.46 |
| 7,466,234 | B2 * | 12/2008 | Simske et al. | 340/572.1 |
| 2005/0021479 | A1 * | 1/2005 | Jorba et al. | 705/67 |
| 2005/0097054 | A1 * | 5/2005 | Dillon | 705/51 |
| 2005/0261937 | A1 * | 11/2005 | Silverbrook et al. | 705/2 |

OTHER PUBLICATIONS

Dr. Andrew D. Dubner—"Securing the Pharmaceutical Supply Chain—The Authenticated RFID Platform"—3M White Paper—Jun. 2005—8 pages.

* cited by examiner

Primary Examiner — Calvin L Hewitt, II
Assistant Examiner — Tsan-Yu J Huang

(57) ABSTRACT

In one embodiment of the present invention, a source point in a supply chain generates a secret and devises a secret sharing scheme that parcels the secret into a number of secret shares. The source point retains at least one secret share, and distributes the remaining secret shares to trusted, intermediate points in the supply chain. The source point then ships a shipment comprising are least one object, and frequently including at least one level of packaging, to a destination point in the supply chain, labeling the object or objects and/or packaging enclosing the object or objects with the retained secret share. Each intermediate point incorporates the secret share obtained by the intermediate point from the source point into the object, packaging enclosing the object, or a label on the object or packaging. At the destination point, the recipient of the object can use the secret shares incorporated into the object, packaging enclosing the object, or a label on the object or packaging to reconstruct the secret initially generated by the source point, and compares the reconstructed secret to the original secret forwarded from the source point.

16 Claims, 13 Drawing Sheets ced distribution centers, and other trusted points in the pharmaceutical supply chain.

SHIPMENT AUTHENTICATION AND TRACKING

TECHNICAL FIELD

The present invention is related to security and authentication, and, in particular, to authentication and tracking of objects shipped in a supply chain from a source point to a destination point through intermediate distribution points.

BACKGROUND OF THE INVENTION

Security of shipped objects in supply chains has been a problem for manufacturers, shippers, distributors, and recipients of shipped goods for thousands of years. Security issues have been addressed by many different techniques, including various types of seals, such as wax seals, markings and encodings, trusted distributors and distribution agencies, trademarks, armed guards, and, more recently, mechanical and electronic devices and computer-based systems for ensuring that an object sent from a source point in a supply chain reaches a destination point intact, untampered with, undamaged, and in a timely fashion. However, as methods for securing shipment of objects have evolved, methods used by counterfeiters and thieves to defeat security methods have also evolved. As a result, theft, counterfeiting, shipment delays, and shipment-routing problems continue to plague supply chains.

One important example of supply-chain-security problems in contemporary commerce is the shipment of pharmaceuticals from pharmaceutical manufacturers to various distributors and retail outlets. FIGS. 1 and 2 illustrate a pharmaceutical-supply-chain context used, in subsequent subsections, as one context for application of the methods of the present invention. In FIG. 1, a large pharmaceutical manufacturer 102 manufacturers pharmaceuticals that are shipped, in the case of FIG. 1, by rail 104 to a number of centralized distribution facilities, such as centralized distribution facility 106. From these centralized distribution centers, smaller shipments 108 of pharmaceuticals are made to a number of regional distribution centers, including regional distribution center 110 in FIG. 1, from which the pharmaceuticals are then shipped by local transport 112 to a number of local distribution centers, including local distribution center 114 in FIG. 1. The pharmaceuticals are finally distributed, by local transport 116, to a number of retail outlets, such as the drugstore 118 shown in FIG. 1. As shown in FIG. 2, the pharmaceuticals may be initially shipped in bulk 202 from the pharmaceutical manufacturer to centralized distribution facilities. The pharmaceuticals may be packaged into bottles at the centralized distribution facilities, and shipped in large packages 204 to regional distribution centers. In the regional distribution centers, the containers may be repackaged 206 into smaller-volume packages, in which the pharmaceuticals are distributed through the supply chain to local distribution centers, from which either small packages or individual bottles 208 of the pharmaceuticals may be distributed to retail outlets. At the retail outlet, pharmaceuticals may again be repackaged into familiar prescription bottles for individual consumers.

The pharmaceutical supply chain illustrated in FIGS. 1 and 2 is but one example of a myriad possible organizations of pharmaceutical supply chains. In some cases, the pharmaceuticals may be fully packaged by the manufacturer in the packaging in which the pharmaceuticals are intended to be delivered to retail outlets. In other cases, bulk powdered or liquid pharmaceuticals may be shipped by manufacturers to secondary drug manufacturers, where they are formed into pills, gelatin capsules, glass bottles with rubber septa for loading syringes, and other final drug products, and then distributed to the supply chain. Retail outlets are but one example of a destination point in a supply chain. In the pharmaceutical-supply-chain context, for example, other destination points include clinics, hospitals, government agencies, and other health care establishments.

Drug counterfeiting has become an increasingly common and increasingly dangerous problem for pharmaceutical manufacturers, distributors, retail outlets, health-care facilities, and consumers. Drug counterfeiters seek to insert falsely labeled, counterfeit pharmaceuticals into the supply chain at various intermediate points in the supply chain in between the manufacturer, or other trusted source point, and a destination point, such as a retail outlet. By doing so, the counterfeiters can circumvent patent rights, government oversight and quality standards, and other well-designed and protective barriers to entering the pharmaceuticals marketplace. However, counterfeit drugs may be either ineffective or dangerous. Therefore, manufacturers, distributors, retailers, and consumers of pharmaceuticals have all recognized the need for improved security techniques for ensuring that the pharmaceuticals received by retail outlets, consumers, and health-care facilities are the legitimate products shipped from trusted source points in the pharmaceutical supply chain, including manufacturers, secondary drug manufacturers, centralized distributors, and other trusted points in the pharmaceutical supply chain.

SUMMARY OF THE INVENTION

In one embodiment of the present invention, a source point in a supply chain generates a secret and devises a secret sharing scheme that parcels the secret into a number of secret shares. The source point retains at least one secret share, and distributes the remaining secret shares to trusted, intermediate points in the supply chain. The source point then ships a shipment comprising at least one object, and frequently including at least one level of packaging, to a destination point in the supply chain, labeling the object or objects and/or packaging enclosing the object or objects with the retained secret share. Each intermediate point incorporates the secret share obtained by the intermediate point from the source point into the object, packaging enclosing the object, or a label on the object or packaging. At the destination point, the recipient of the object can use the secret shares incorporated into the object, packaging enclosing the object, or a label on the object or packaging to reconstruct the secret initially generated by the source point. The source point forwards the secret to the recipient, so that the recipient can then compare the secret forwarded directly from the source point to the secret reconstructed from the secret shares incorporated into the object, packaging enclosing the object, or a label on the object or packaging. When the secret forwarded directly from the source point is equal to the reconstructed secret, the recipient is confident that the object, packaging, and/or labels into which the secret shares are incorporated or onto which the secret shares are affixed have been shipped through the intermediate points that added secret shares to the object, packaging, and/or labels, and that the object, packaging, and/or labels shipped from the source point have been received.

In alternative embodiments, additional security measures may be used to ensure that packaging incorporating secret shares has not been opened and re-closed. The secret-sharebased method for object authentication in supply chains may also be used to track the route that an object has taken through the supply chain.

DETAILED DESCRIPTION OF THE INVENTION

The present invention is related to securing objects in a supply chain shipped from a destination point to a source point through intermediate points. As discussed in a previous subsection, one context for application of the present invention is pharmaceutical supply chains, in which problems with drug counterfeiters are becoming widespread and potentially dangerous. However, the techniques of the present invention are applicable to any type of supply chain in which objects are shipped, including electronic shipment of information through networks, in which packaging includes network message kneaders, file headers, and other such electronic envelopes.

Figure 1:
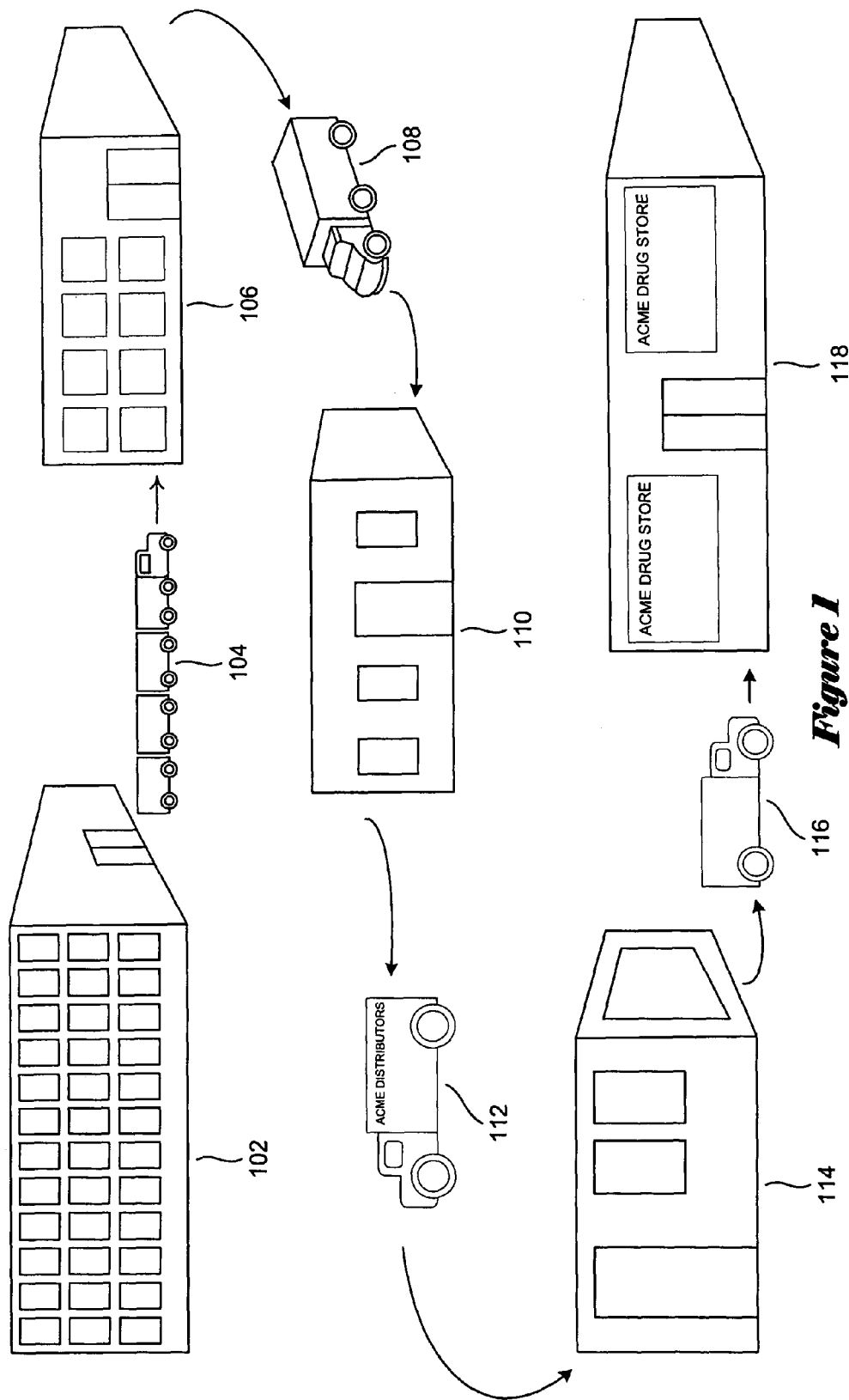
FIGS. 1 and 2 illustrate this pharmaceutical-supply-chain context used, in subsequent subsections, as one context for application of the methods of the present invention.
Figure 2:
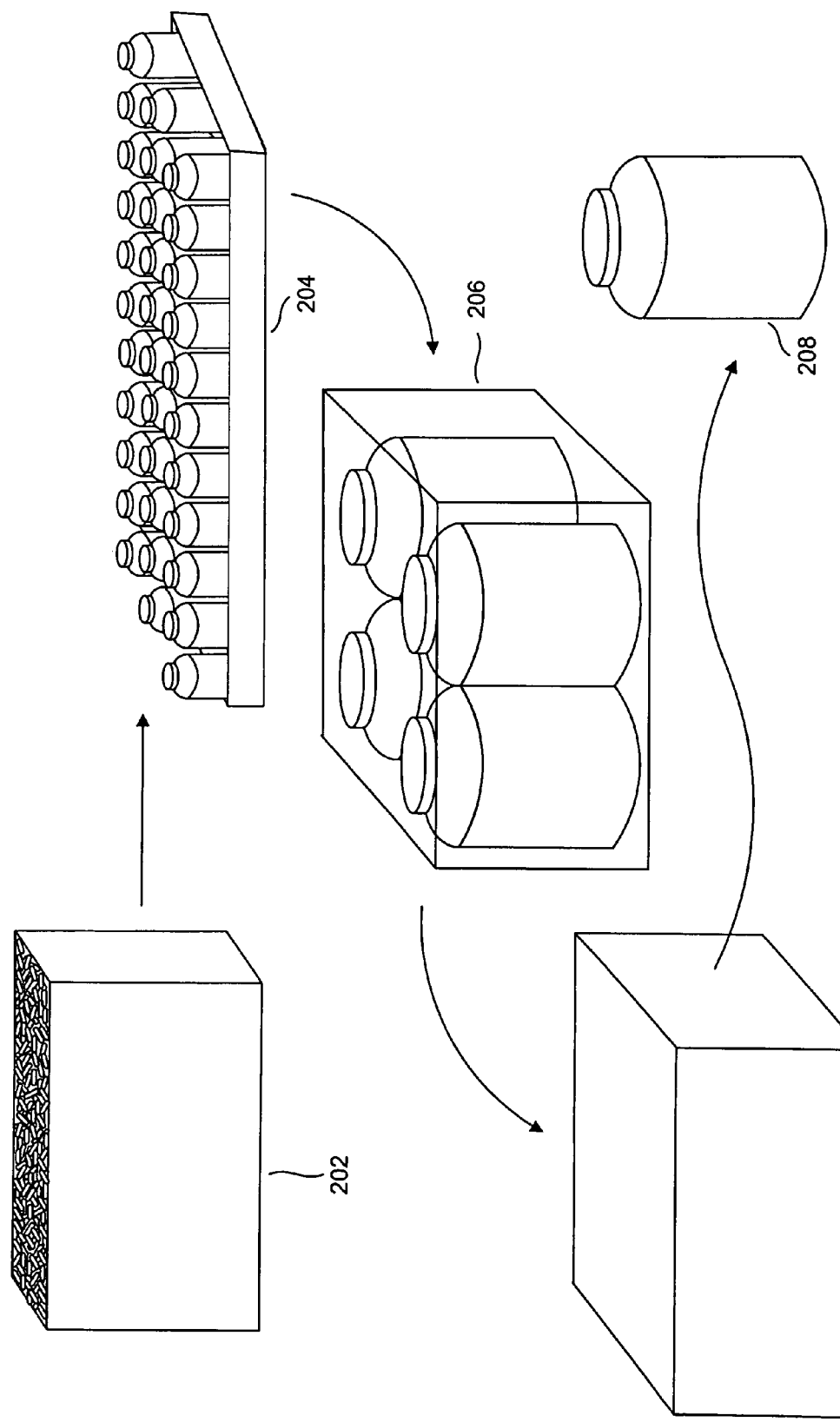
Figure 3:
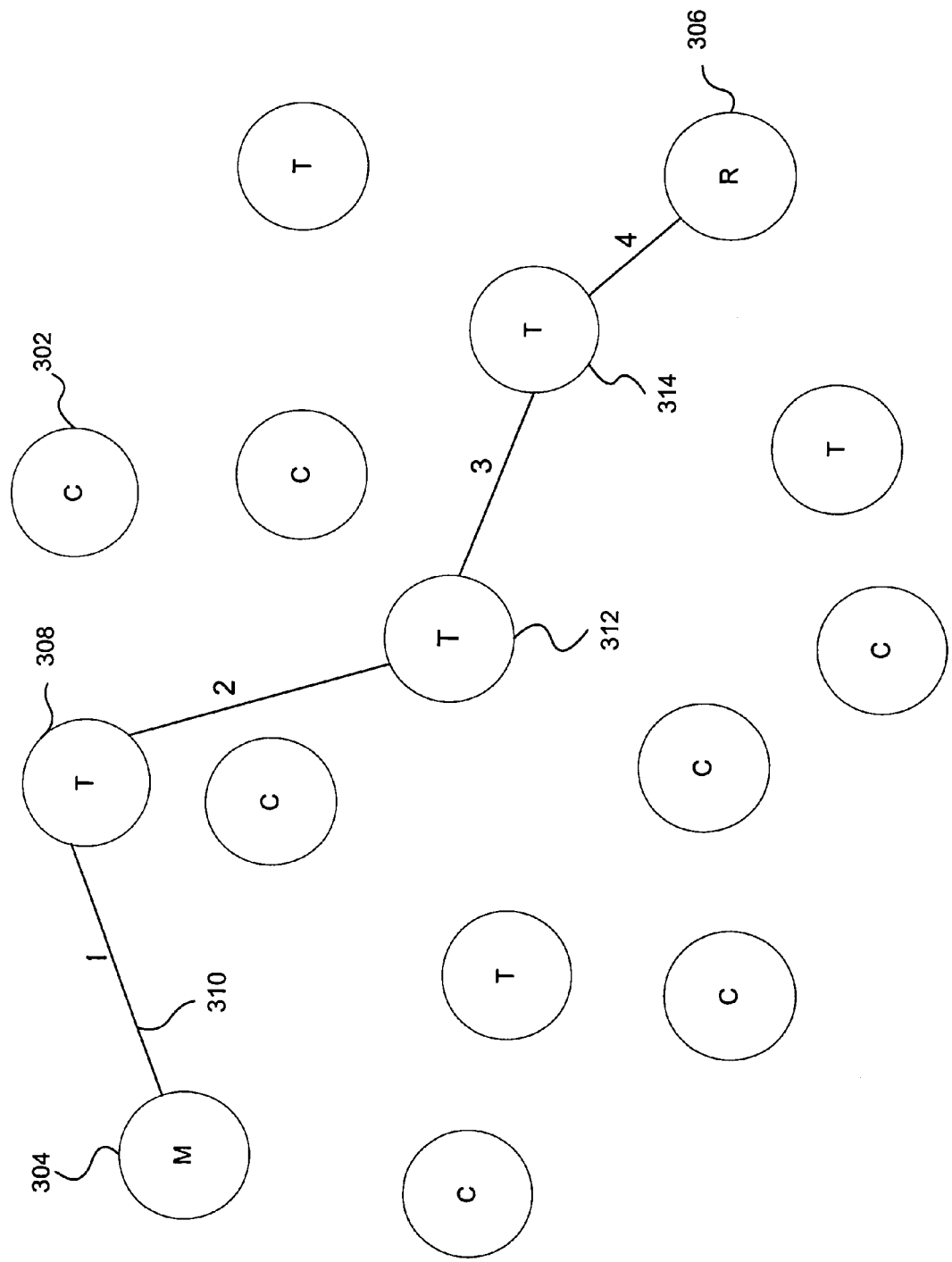
FIGS. 3-5 provide a more abstract presentation of a problem addressed by method embodiments of the present invention.
Figure 4:
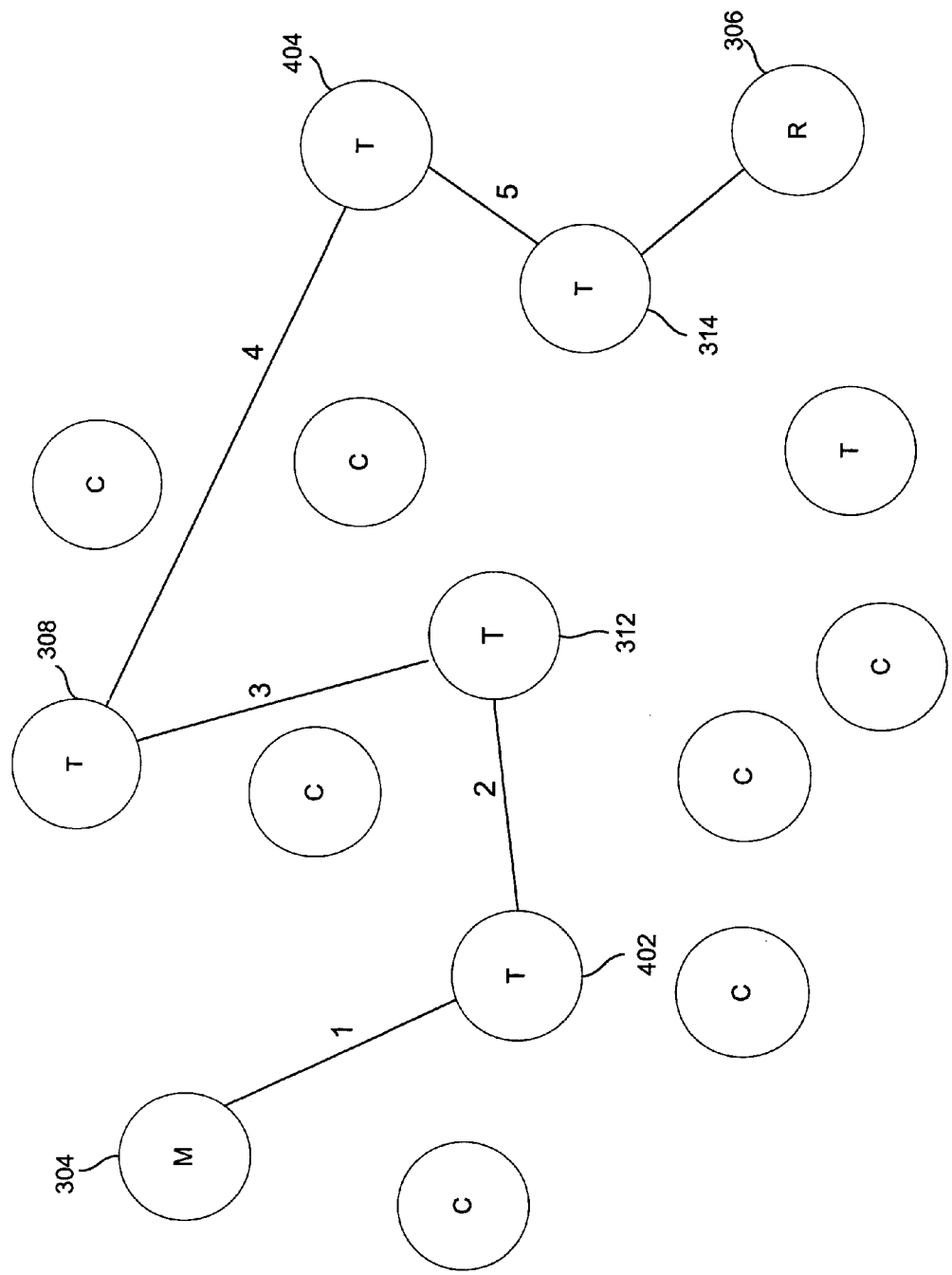
Figure 5:
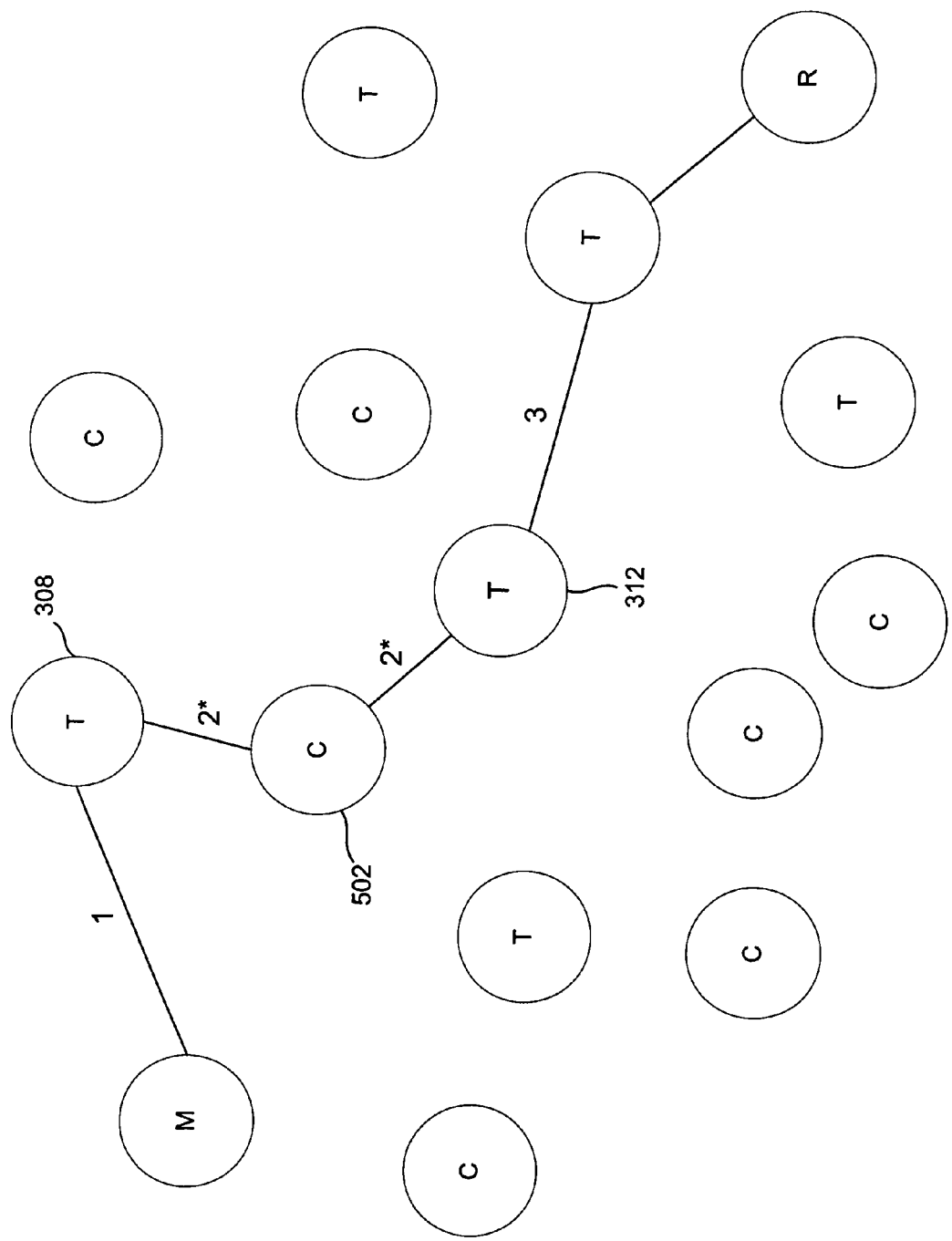

FIGS. 3-5 provide a more abstract presentation of a problem addressed by methods of the present invention. The illustration conventions used in all of FIGS. 3-5 are described with reference to FIG. 3. In FIG. 3, each circle, such as circle 302, represents a potential point in a supply chain. Circle 304, labeled "M" in FIG. 3, represents the source point for a particular shipment. In the context of the pharmaceutical supply chain illustrated in FIGS. 1 and 2, source point 304 may correspond to a pharmaceuticals manufacturer (102 in FIG. 1). Circle 306, labeled "R," is the destination point for a particular shipment. The destination point may correspond, in the pharmaceuticals context illustrated in FIGS. 1 and 2, to a retail outlet (118 in FIG. 1). Circles, such as circle 308, labeled "T" in FIG. 3, represent trusted intermediate points, or nodes, within the supply chain, and circles, such as circle 302, labeled "C" in FIG. 3, represent untrusted nodes, such as counterfeiters in the pharmaceutical-supply-chain context. When the source point ships a shipment to the destination point 306, the shipment follows a pathway comprising a series of individual point-to-point shipments, represented by lines, such as line 310, and trusted nodes, such as trusted node 308, that connect the source point 304 with the destination point 306. In FIG. 3, the path taken by the shipment passes from the source point 304 through intermediate nodes 308, 312, and 314 prior to arriving at the destination point 306. This path involves four different node-to-node deliveries and three intermediate nodes.

Often, the source point cannot exactly predict, or predetermine, the path through intermediate nodes to the destination point. FIG. 4 shows an alternate path from the source point 304 to the destination point 306 for the shipment described above, with respect to FIG. 3. In this case, the shipment passes through intermediate nodes 402, 312, 308, 404, and 314 before arriving at the destination point 306. In this case, there are five intermediate nodes and six node-to-node deliveries. Both the path shown in FIG. 3 and the path shown in FIG. 4 are valid paths, from the standpoint of the source point 304 and the destination point 306, because the shipment passes only through trusted nodes.

FIG. 5 shows an invalid path for the shipment described above with reference to FIGS. 3 and 4. In FIG. 5, an untrusted node 502 has interposed itself within the node-to-node delivery between trusted node 308 and trusted node 312. In the pharmaceutical-supply-chain context, this untrusted node may represent a counterfeiter who substitutes counterfeit drugs for the drugs shipped from trusted node 308, so that trusted node 312 receives counterfeit drugs, rather than authentic drugs. The counterfeiter may impose itself in many different ways, including penetrating the security of either trusted node 308 or trusted node 312, or somehow intercepting and tampering with the node-to-node delivery.

Although the source point may not be able to predict the actual path taken by a shipment through intermediate nodes, the source point may often know the least number of intermediate points expected for a shipment. For example, in the pharmaceutical-supply-chain context illustrated in FIGS. 1 and 2, the manufacturer may not know which regional distribution centers, and how many regional distribution centers, may be involved in a particular shipment, but may know that at least one centralized distribution center, one regional distribution center, and one local distribution center should always be involved in shipping pharmaceuticals to a retail outlet. Moreover, the manufacturer also generally knows how long a shipment should take, and therefore can place a reasonable time expectation on receipt by the retail outlet of drugs shipped at a particular point in time. The class of problems addressed by embodiments of the present invention relate to providing a way for the destination point to authenticate a shipment, in the case of the shipment having taken valid pathways, such as those shown in FIGS. 3 and 4, and to fail to authenticate a shipment passing through an untrusted node, as shown in FIG. 5, with the constraints that the source point knows the least number of trusted intermediate points to be expected in any valid path, and a reasonable time bound for a shipment.

Figure 6A:
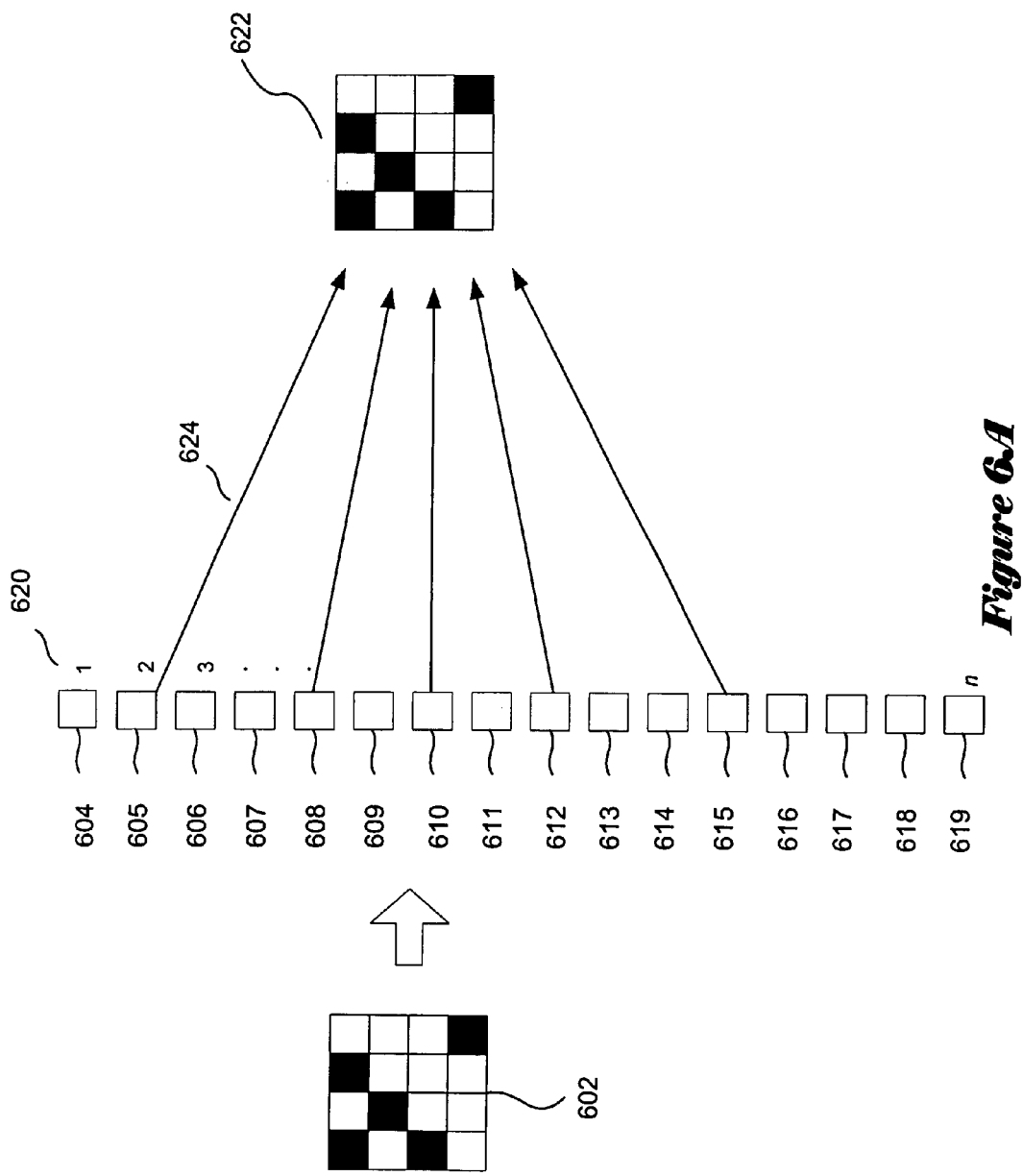
FIGS. 6A-D illustrate the concept of the shared secret.

Various embodiments of the present invention use a cryptography technique known as a shared secret. FIGS. 6A-D illustrate the concept of the shared secret. In FIG. 6A, the left-hand block 602 represents a secret. Secrets may be any of an almost limitless number of types of information, including numbers, text strings, encodings of numerical or textural values into images, and many other types of information. In FIG. 6A, the secret is represented as a pattern of black and white squares within the larger rectangle 602.

In a secret sharing system, a secret can be broken down into pieces, referred to as "secret shares," shown as a number of small squares 604-619 in a central column 620 in FIG. 6A. The secret shares do not necessarily represent a simple division of the original secret and may not be similarly encoded or represented as the original secret, and thus, in FIG. 6A, the secret shares in column 620 are not colored black and white, in the same way as the original secret 602. Note also that there are n secret shares in column 620. In a secret sharing system, anyone who possesses some minimum number k of the n secret shares can use the k secret shares to reconstitute the original secret. For example, in FIG. 6A, possession of five secret shares 605, 608, 610, 613, and 616 allow for reconstruction of the original secret 622, as indicated by the arrows, such as arrow 624, from the five secret shares 605, 608, 610, 613, and 616 to the reconstructed secret 622. A secret sharing system can be referred to as an S(n,k) system, where n is the number of secret shares into which the original secret can be divided, and k is the minimum number of secret shares needed in order to reconstitute the original secret. In general, k is significantly smaller than n. The secret sharing system illustrated in FIG. 6A is an example of an S(16,5) secret sharing system, assuming that at least five secret shares are needed to reconstruct the original secret.

Figure 6B:
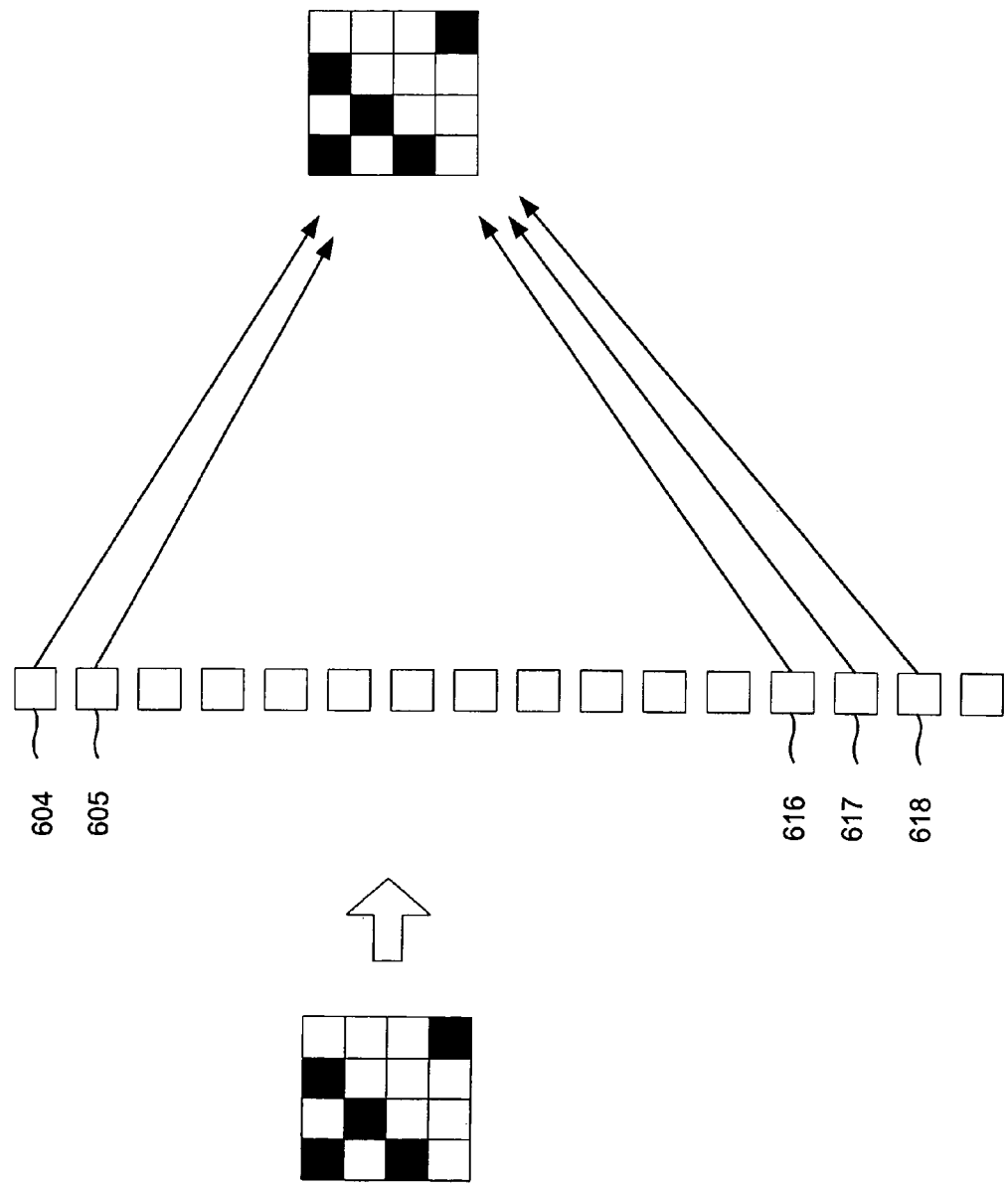
Figure 6C:
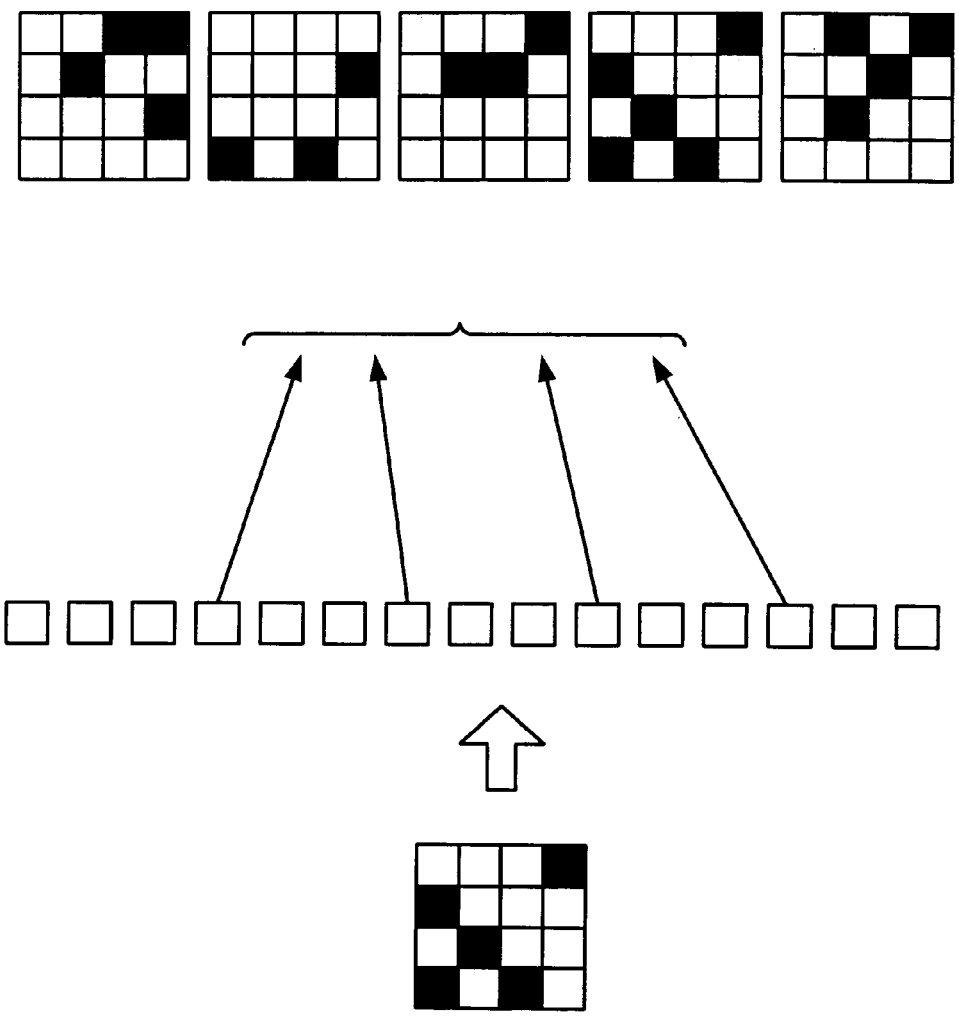
Figure 6D:
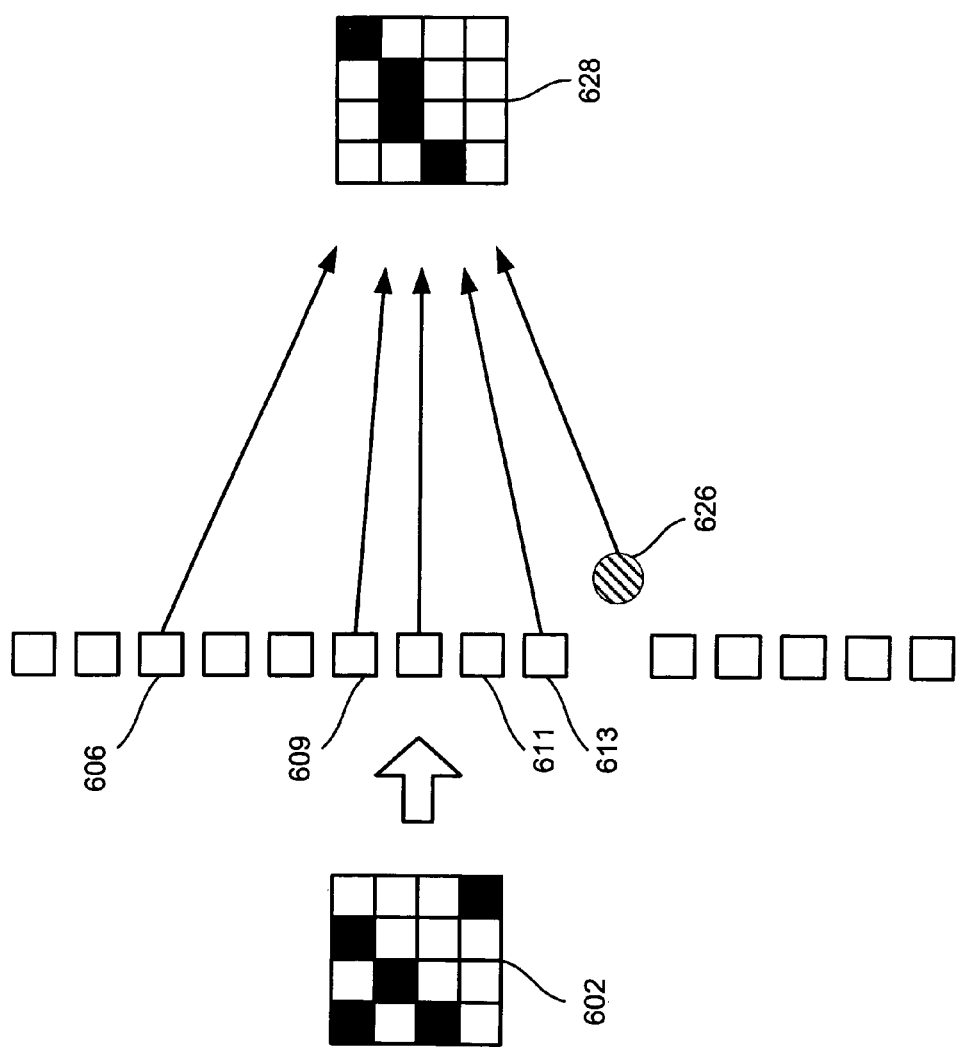

The secret sharing system is generally insensitive to which k of the n secret shares are used to reconstitute the original secret. As shown in FIG. 6B, a set of five secret shares 604, 605, 616, 617, and 618, different from the set shown in FIG. 6A, can also be used to reconstitute the original secret. However, as shown in FIG. 6C, one possessing less than k secret shares cannot reconstitute a unique secret corresponding to the original secret. In FIG. 6C, an attempt to reconstitute the original secret using four secret shares produces an indefinite result, or essentially any of the many different possible coloration patterns for a 4×4 grid. As shown in FIG. 6D, using four valid secret shares and a single invalid secret share generally produces a different secret than the original secret, upon reconstitution. In FIG. 6D, four valid secret shares 606, 609, 611, and 613 and an invalid secret share 626 are used in an attempt to reconstitute the original secret 602, but instead produce a different block-coloration pattern 628. Similarly, if j>k secret shares are used to reconstruct the original secret, and one of the j secret shares is invalid, the reconstructed secret will not correspond to the original secret. By comparing a secret reconstituted using j≧k secret shares to the original secret, the validity of the j secret shares can be tested.

Secret sharing systems find application in many types of cryptographic operations and authentication systems. For example, an organization may wish to authorize subgroups of officers to carry out certain tasks, but may also wish to ensure that no single officer, or group of officers less than a minimum size, be authorized to carry out such operations. The officers of the company can all be provided with individual secret shares, and each subgroup of officers that carry out a task may be required to provide their secret shares to an authentication system which reconstitutes an original secret from the secret shares and verifies that the reconstituted secret matches a stored, original secret. It should also be noted that, in many secret sharing systems, any number of secret shares between k and n may be used to reconstitute the original secret. Thus, k is the minimum number of secret shares needed to reconstitute the secret, but more than k secret shares can also be used to reconstitute the original secret. In many systems, if j>k secret shares are obtained, the validity of all j secret shares can be tested by using all j secret shares to reconstitute the secret, and compare the reconstituted secret to the original secret. If the test fails, then each possible set of k secret shares from among the j secret shares obtained can be separately tested by reconstituting the secret in order to identify the invalid secret shares, if k or more valid secret shares have been obtained.

Figure 7A:
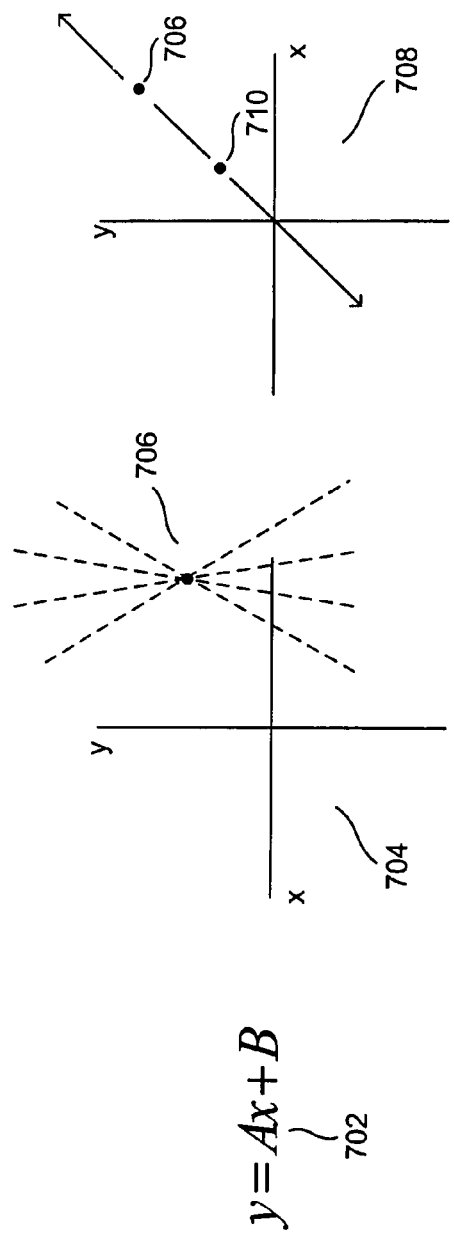
FIGS. 7A-B illustrate a property of single-variable polynomials.
Figure 7B:
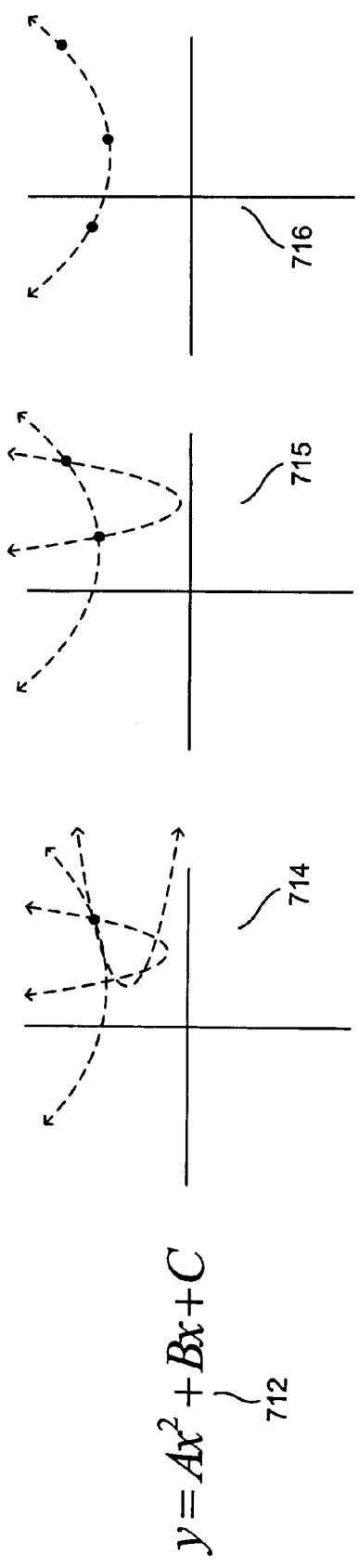

In certain embodiments of the present invention, a polynomial-based secret sharing system may be employed. FIGS. 7A-B illustrate a property of single-variable polynomials. FIG. 7A shows a general expression 702 for a first-order polynomial. The order of a polynomial is the highest power of the independent variable x in the expression for the polynomial. In a first xy plot 704, FIG. 7A shows that, with a single specified point 706, there are an infinite number of straight lines, the graphical representations of first-order polynomials, that pass through a single specified point 706. However, as shown in the next xy plot 708, when two points 706 and 710 are specified, there is only one line that includes both specified points, and therefore only a single first-order polynomial, having unique values for coefficients A and B, for which the two specified points 706 and 710 represent solutions. Similarly, FIG. 7B shows a generalized expression for a second-order polynomial 712, and xy plots 714-716 that illustrate that three points need to be specified in order to uniquely determine the three coefficients A, B, and C for a particular second-order polynomial. In fact, it is a general property of single-variable polynomials that n+1 points need to be specified in order to uniquely determine an $n^{th}$ order polynomial.

The property of single-variable polynomials, discussed above with reference to FIGS. 7A-B, is the basis for one secret-sharing system. In this system, a secret-sharing-system manager devises a secret S, represented as a numerical value. Next, the secret-sharing-system manager devises an arbitrary single-variable polynomial of order k−1:

$$P = C_o + C_1 X + C_2 X^2 + C_3 X^3 \ldots C_{k-1} X^{k-1}$$

with the constraint that the secret is the value of the polynomial at x=0:

$$S = P(0) = C_o$$

Then, the secret-sharing system manager produces n secret shares $S_1, S_2, \ldots S_n$ by evaluating the polynomial P at x=1, x=2, ... x=n, producing a table of shared secrets as follows:

| | |
|---|---|
| S1 | P(1) |
| S2 | P(2) |
| S3 | P(3) |
| . | . |
| . | . |
| . | . |
| Sn | P(n) |

Thus, a secret share constitutes two discrete values, an index or secret-share number and the value of the polynomial P when evaluated at x equal to the index or secret-share number:

$$S_i = (i, P(i))$$

In practical, polynomial-based secret sharing systems, the polynomials are computed within an integer field of size>n.

The secret may be reconstructed from k secret shares by using any of many methods devised for generating a unique polynomial $P_C$ of order k−1 from k solutions for the polynomial. In general, a number of points greater than k may also be used. The value of $P_C(0)$ can then be compared with the value of P(0) to determine whether or not the secret shares are valid, or, in other words, generate $P_C$ equal to the original polynomial P.

Figure 8:
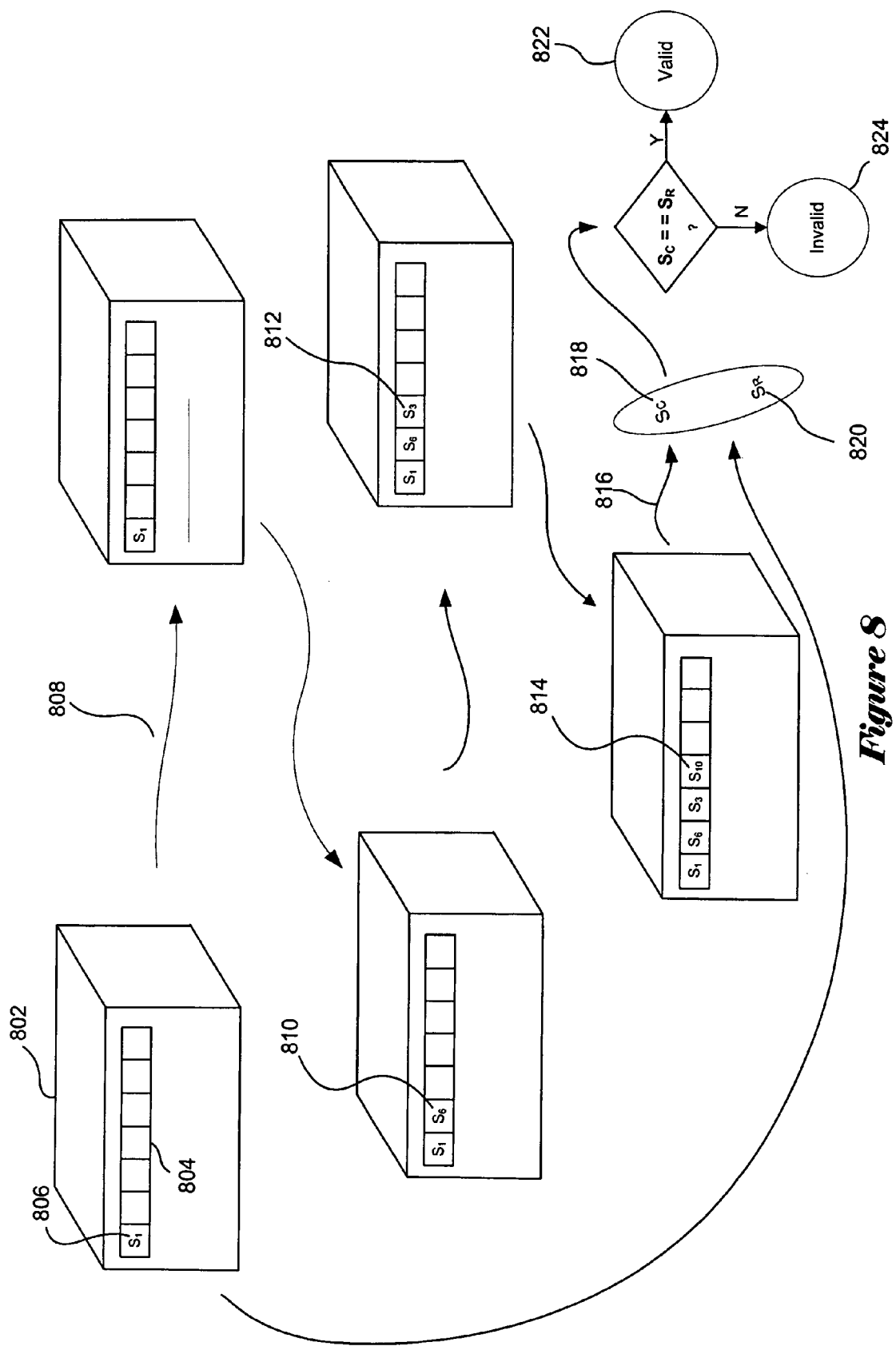
FIG. 8 illustrates a shipment authentication system that represents one embodiment of the present invention.

FIG. 8 illustrates a shipment authentication system that represents one embodiment of the present invention. A source point, such as the pharmaceutical manufacturer (102 in FIG. 1) in the pharmaceutical-supply-chain context discussed with reference to FIGS. 1 and 2, devises a secret S and an S(n,k) secret-sharing system, where k is the least number of points in a valid path through the supply chain, including the source point, and n is the number of trusted points in the supply chain, including the source point. The source point then distributes n−1 of the shared secrets to the n−1 potential intermediate points, reserving one shared secret for use by the source point. The source point then prepares a shipment 802, labeling the shipment with a label 804 into which secret shares can be incorporated, and incorporates the secret share $S_1$ 806, reserved for the source point, into the label 804. The shipment is then shipped from the source point to a first intermediate node 808, and the first intermediate node incorporates its secret share $S_6$ 810 into the label and forwards the shipment to a next intermediate node. The next intermediate node incorporates its shared secret 812 within the label, and ships the shipment on to a final intermediate node, which incorporates its shared secret into the label 814. It should be appreciated that a label may be a piece of printed paper, plastic, film, or composite material affixed to a package or object, but may also be information directly incorporated within, or embossed or imprinted on, an object being shipped or packaging enclosing the object.

The shipment finally reaches the destination point following shipment from the final intermediate node 816. At the destination point, the shared secrets incorporated into the label 804 of the shipment are extracted and employed to compute, or reconstruct, the original shared secret $S_C$ 818. The destination point directly receives a copy of the original shared secret $S_R$ 820 from the source point. In general, the source points waits for some period of time prior to making a copy of the original secret available to the destination point. The destination point can then compare the secret computed from the extracted secret shares $S_C$ with the copy of the original secret directly received from the source point $S_R$. If $S_C$ is equal to $S_R$, then the shipment has been authenticated 822. Otherwise, the shipment is declared invalid 824.

There are many variations and alternative embodiments for the shared-secret-system-based shipment authentication method of the present invention. For example, there are many ways for the secret shares to be incorporated onto the shipment. They may be incorporated as numeric marks, text-string marks, as electronic values stored within small radio-frequency electronic devices attached to the shipment, as data stored within smart cards, and in many other ways. The source point may wait for a period of time equal to the expected time of shipment before revealing the original secret to the destination point, or may choose smaller or greater times, depending on additional considerations. The shared secrets may be included in one label, or incorporated on one type of packaging, or may be incorporated in nested labels or nested packaging, such as both the labels on bottles of pharmaceuticals within a package as well as on a label fixed to the package containing the bottles. A shared secret may be directly incorporated, in the pharmaceutical-supply-chain context, in individual pills, capsules, or doses. The source point and destination point may also cooperate in order to glean tracking information from the shared secrets incorporated within, or affixed to, a shipment. In the embodiment shown in FIG. 8, if the secret shares are fixed in order to the label, they represent a sequential list of the intermediate points in the supply chain through which the shipment passed. If a shipment fails to be authenticated, and if there are more secret shares incorporated within, or affixed to, the shipment, then the minimum number of secret shares k needed to reconstitute the original secret, then the destination point can reconstitute the secret from all combinations of k secret shares incorporated within, or affixed to, the shipment in order to determine which of the secret shares are invalid, and therefore identify points within the supply chain at which invalid secret shares were introduced.

Figure 9:
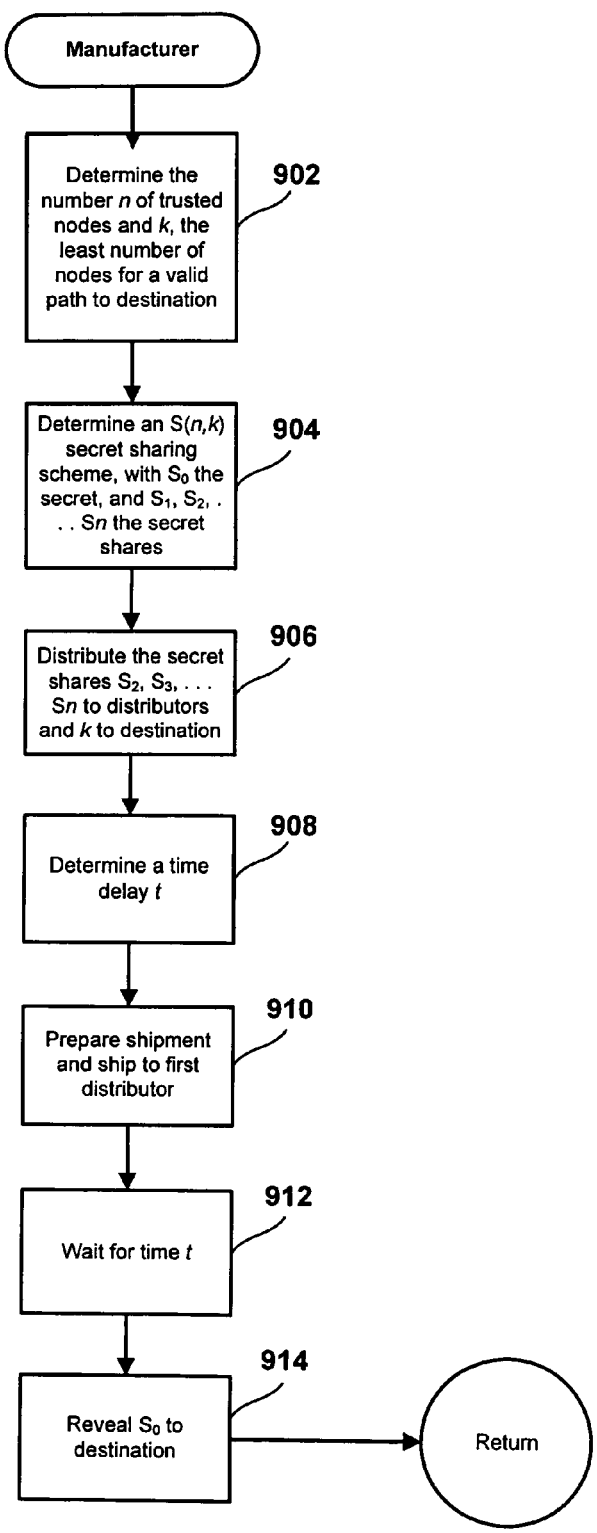
FIG. 9 is a control-flow diagram representing the steps taken by a source point in order to securely ship a shipment in a supply chain to a destination point according to one embodiment of the present invention.

FIG. 9 is a control-flow diagram representing the steps taken by a source point in order to securely ship a shipment in a supply chain to a destination point according to one embodiment of the present invention. In step 902 the manufacturer, or source point, determines the number of trusted intermediate points, including the source point, n and the minimum number of intermediate points, including the source point, k, for the shipment. In step 904, the source point devises an S(n,k) secret sharing scheme, and incorporates a secret $S_0$ into the secret sharing scheme. The source point also obtains secret shares $S_1, S_2, \ldots S_n$ for the secret sharing scheme S(n,k). In step 906, the manufacturer distributes secret shares $S_2, S_3, \ldots S_n$ to n−1 intermediate points, and supplies the number k to the destination point, or makes the number k publicly available. The system design also implies that the method for reconstituting the original secret is supplied to the destination point, or made publicly available to the destination point. However, the source point does not reveal the original secret $S_0$ or the secret share $S_1$ reserved for use by the source point. Next, in step 908, the source point determines a time delay t to wait, following shipment, before revealing or transmitting the original secret $S_0$ to the destination point. In step 910, the source point prepares a shipment, incorporating the secret share $S_1$ reserved by the source point in the shipment. Then, the source point ships the shipment to the first intermediate point, or distributor. The source point, in step 912, waits for the predetermined time t and then, in step 914, reveals the original secret $S_0$ to the destination point. It should be noted that the source point may itself ship the shipment, or may transfer the shipment to a shipping agency for shipping into the supply chain. Furthermore, the source point may either package and label the shipment, or contract a third party to package and label the shipment.

Figure 10:
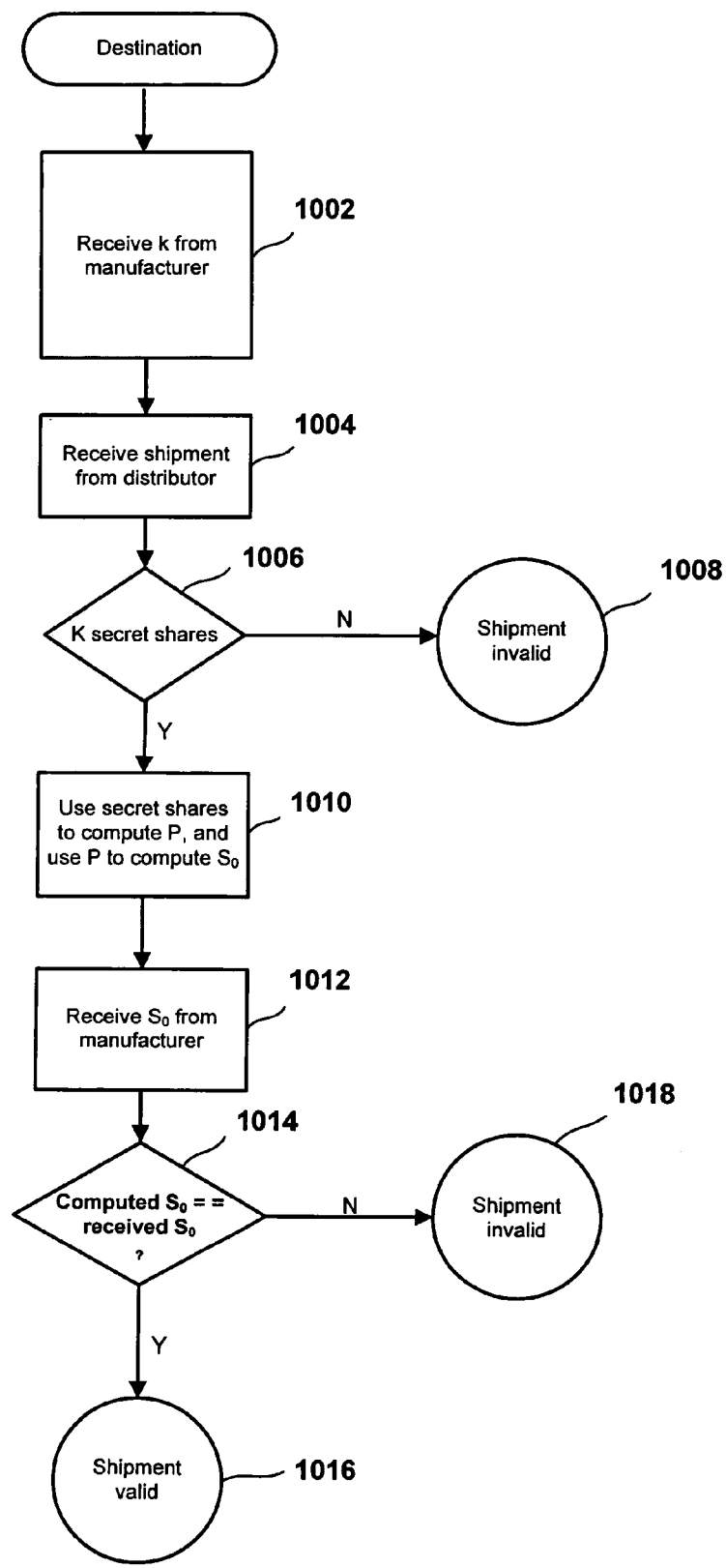
FIG. 10 is a control-flow diagram representing steps undertaken by a destination point to authenticate a shipment, received through a supply chain, according to one embodiment of the present invention.

FIG. 10 is a control-flow diagram representing steps undertaken by a destination point to authenticate a shipment, received through a supply chain, according to one embodiment of the present invention. First, in step 1002, the destination point receives the value k, as well as the algorithm for reconstituting the original secret, from the manufacturer, or source point. The source point may transmit, or reveal, this information prior to shipping each different shipment, or the source point may reveal this information prior to shipping a series of shipments, since an almost limitless number of different S(n,k) secret sharing systems can be devised for any particular value k and a reconstitution algorithm. In step 1004, the destination point receives the physical shipment from a final distributor. In step 1006, the destination point checks to see if k secret shares have been incorporated within, or affixed to, the shipment. If not, then the shipment is declared invalid 1008. Otherwise, in step 1010, the destination point uses the secret shares incorporated within, or affixed to, the shipment to reconstitute the original secret $S_0$. In step 1012, the destination point receives a copy of $S_0$ directly from the source point. Note that step 1012 may, in certain cases, precede any of the previous steps in the control-flow diagram. In step 1014, the destination point determines whether the computed value $S_0$ is equal to the value $S_0$ directly received from the source point. If so, the shipment is declared valid, or authenticated 1016, and if not, the shipment is declared invalid, or fails to authenticate 1018.

Different shared secrets and secret sharing schemes are generally used for each different shipment, to prevent counterfeiters from acquiring sufficient information by monitoring shipments in order to defeat authentication in a future shipment. Secrets may be altered by appending random bits to previously used secrets.

Although the present invention has been described in terms of a particular embodiment, it is not intended that the invention be limited to this embodiment. Modifications within the spirit of the invention will be apparent to those skilled in the art. For example, any of the many different secret sharing systems known in the cryptography community can be used in various different embodiments of the present invention. Although such systems can be based on polynomials, they can also be based on numerous other types of mathematical phenomena and/or physical phenomena. In alternative embodiments, the source point may not reserve a secret share for itself, and may distribute all n secret shares to intermediate points which alone incorporate secret shares, or affix secret shares to, shipments, or may, instead, reserve more than 1 secret share for itself, and incorporate all of these secret shares into the object, packing, and/or label prior to shipping the object. As noted above, secret shares may not necessarily all be incorporated within, or affixed to, the same level of packaging, but may be incorporated within, or affixed to, nested packing and even the one or more shipped objects themselves. In the described embodiment, the manufacturer was considered the source point, but the source point may be any intermediate point in the supply chain. In the described embodiment, the source point devises the secret and secret sharing schemes, and distributes secret shares, but outside entities may instead devise the secret and secret sharing schemes and distribute secret shares to intermediate points, including the source point.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents:

1. A method for authenticating a shipment shipped from a source point to a destination point through a supply chain and passing through trusted intermediate points of the supply chain, the method comprising:
    devising, by a processor, a secret $S_o$ and an S(n,k) secret sharing system;
    distributing a secret share to each of the trusted intermediate points;
    shipping the shipment from the source point to a first intermediate point;
    providing, by the processor, a secret reconstruction method and the number k to the destination point; and
    revealing the secret $S_o$ to the destination point.

2. The method of claim 1 further including, when a trusted intermediate point receives the object, incorporating the secret share distributed to the trusted intermediate point in the shipment.

3. The method of claim 2 wherein incorporating the secret share distributed to the trusted intermediate point within the shipment further includes one or more of:
    affixing or incorporating the secret share into or onto the object being shipped in the shipment;
    affixing or incorporating the secret share into or onto one or more levels of packaging enclosing the object being shipped in the shipment, and
    affixing or incorporating the secret share into or onto one or more one or more labels affixed to the object or packaging.

4. The method of claim 2 further including:
    when the destination point receives the shipment, using the secret shares incorporated within the shipment to reconstruct the secret as a computed secret $S_c$ and, when the computed secret $S_c$ is equal to the revealed secret $S_o$, determining the shipment to be authenticated.

5. The method of claim 1 wherein the secret sharing system an S(n,k) secret is based on a single-variable polynomial, with $S_o$ equal to the value of the polynomial when the independent variable has the value 0.

6. The method of claim 1 wherein k is the minimum number of secret shares expected to be incorporated within the shipment during shipping from the source point to the destination point, and n is the total number of trusted points in the supply chain which may incorporate a shared secret into the shipment.

7. The method of claim 1 wherein the secret is a number, digitally encoded text string, or graphically encoded number, and secret shares are numbers, digitally encoded text strings, or graphically encoded numbers.

8. The method of claim 1 wherein a period of time elapses between shipping the shipment from the source point and revealing the secret $S_o$ to the destination point.

9. A method for authenticating an object shipped through a supply chain from a source point to a destination point and passing through trusted intermediate points of the supply chain, the method comprising:
    using the secret shares incorporated within the shipment to reconstruct, by a processor, a secret as a computed secret $S_c$ and, when the computed secret $S_c$ is equal to a revealed original secret $S_o$, determining the shipment to be authenticated.

10. The method of claim 9 further including:
    devising the original secret $S_o$ and an S(n,k) secret sharing system;
    distributing a secret share to each of the trusted intermediate points;
    shipping the shipment from the source point to a first intermediate point;
    providing a secret reconstruction method and the number k to the destination point; and
    revealing the original secret $S_o$ to the destination point.

11. The method of claim 10 further including:
    when a trusted intermediate point receives the shipment, incorporating the secret share distributed to the trusted intermediate point within the shipment.

12. The method of claim 11 wherein incorporating the secret share distributed to the trusted intermediate point within the shipment further includes one or more of:
    affixing or incorporating the secret share into or onto the object being shipped in the shipment;
    affixing or incorporating the secret share into or onto one or more levels of packaging enclosing the object being shipped in the shipment, and
    affixing or incorporating the secret share into or onto one or more one or more labels affixed to the object or packaging.

13. The method of claim 11 wherein the secret is a number, digitally encoded text string, or graphically encoded number, and secret shares are numbers, digitally encoded text strings, or graphically encoded numbers.

14. The method of claim 11 wherein the secret sharing system an S(n,k) secret is based on a single-variable polynomial, with $S_o$ equal to the value of the polynomial when the independent variable has the value 0.

15. The method of claim 11 wherein k is the minimum number of secret shares expected to be incorporated within the shipment during shipping from the source point to the destination point, and n is the total number of trusted points in the supply chain which may incorporate a shared secret into the shipment.

16. The method of claim 9 wherein a period of time elapses between shipment of the shipment from the source point and revealing the original secret $S_o$ to the source point.

* * * * *

UNITED STATES PATENT AND TRADEMARK OFFICE
CERTIFICATE OF CORRECTION

| | |
|---|---|
| PATENT NO. | : 8,209,263 B2 |
| APPLICATION NO. | : 11/112583 |
| DATED | : June 26, 2012 |
| INVENTOR(S) | : Vinay Deolallkar et al. |

It is certified that error appears in the above-identified patent and that said Letters Patent is hereby corrected as shown below:

In column 9, line 47, in Claim 1, delete "$S_o$," and insert -- $S_0$ --, therefor.

In column 9, line 55, in Claim 1, delete "$S_o$," and insert -- $S_0$ --, therefor.

In column 10, line 2, in Claim 3, before "labels" delete "one or more".

In column 10, line 7, in Claim 4, delete "$S_c$," and insert -- $S_C$ --, therefor.

In column 10, line 8, in Claim 4, before "is" delete "$S_c$," and insert -- $S_C$ --, therefor.

In column 10, line 8, in Claim 4, delete "$S_o$,," and insert -- $S_0$, --, therefor.

In column 10, line 12, in Claim 5, delete "$S_o$," and insert -- $S_0$ --, therefor.

In column 10, lines 19-20, in Claim 6, delete "which may incorporate a shared secret into the shipment." and insert -- and is therefore the maximum number of secret shares expected to be incorporated within the shipment during shipping from the source point to the destination point. --, therefor.

In column 10, line 27, in Claim 8, delete "$S_o$," and insert -- $S_0$ --, therefor.

In column 10, line 33, in Claim 9, after "using" delete "the".

In column 10, line 33, in Claim 9, delete "shares" and insert -- shares, generated by an S(n,k) secret sharing system, which are --, therefor.

In column 10, line 35, in Claim 9, before "and," delete "$S_c$," and insert -- $S_C$ --, therefor.

In column 10, line 35, in Claim 9, delete "$S_c$," and insert -- $S_C$ --, therefor.

Signed and Sealed this
Fifteenth Day of January, 2013

David J. Kappos
*Director of the United States Patent and Trademark Office*

CERTIFICATE OF CORRECTION (continued)
U.S. Pat. No. 8,209,263 B2

In column 10, line 36, in Claim 9, delete "$S_o,$" and insert -- $S_0,$ --, therefor.

In column 10, line 39, in Claim 10, delete "$S_o$" and insert -- $S_0$ --, therefor.

In column 10, line 47, in Claim 10, delete "$S_o$" and insert -- $S_0$ --, therefor.

In column 10, line 62, in Claim 12, before "labels" delete "one or more".

In column 11, line 3, in Claim 14, delete "$S_o$" and insert -- $S_0$ --, therefor.

In column 12, line 5, in Claim 36, delete "$S_o$" and insert -- $S_0$ --, therefor.